United States Patent [19]

McFiggans

[11] Patent Number: 4,611,282

[45] Date of Patent: Sep. 9, 1986

[54] POSTAGE METER USING A FLAG TO INDICATE INTERUPTION OF ACCOUNTING REGISTER UPDATING DUE TO POWER FAILURE OR MICROPROCESSOR FAILURE

[75] Inventor: Robert B. McFiggans, Stamford, Conn.

[73] Assignee: Pitney Bowes Inc., Stamford, Conn.

[21] Appl. No.: 514,412

[22] Filed: Jul. 18, 1983

[51] Int. Cl.⁴ ............... G07B 17/02; G07B 17/04
[52] U.S. Cl. ................... 364/406; 364/900; 364/466
[58] Field of Search ... 364/200 MS File, 900 MS File, 364/406, 466; 371/66; 377/32

[56] References Cited

U.S. PATENT DOCUMENTS

| | | | |
|---|---|---|---|
| 3,978,457 | 8/1976 | Check, Jr. et al. | 364/200 |
| 4,253,015 | 2/1981 | McFiggans et al. | 377/32 |
| 4,285,050 | 8/1981 | Muller | 364/900 |
| 4,301,507 | 11/1981 | Soderberg et al. | 364/464 |
| 4,327,410 | 4/1982 | Patel et al. | 364/200 |
| 4,393,500 | 7/1983 | Imazeki et al. | 371/66 X |
| 4,412,284 | 10/1983 | Kerforne et al. | 371/66 X |
| 4,471,441 | 9/1984 | Check, Jr. | 364/900 X |

FOREIGN PATENT DOCUMENTS

0019515  11/1980  European Pat. Off. .

Primary Examiner—Jerry Smith
Assistant Examiner—Clark A. Jablon
Attorney, Agent, or Firm—David E. Pitchenik; Albert W. Scribner; William D. Soltow, Jr.

[57] ABSTRACT

In an electronic postage meter having a program for updating accounting memory in a printing cycle, flags are set in the accounting memory at each of a plurality of steps during the updating of the accounting registers, the flags providing an indication in a power-up cycle following a loss of power, of the steps necessary, if any, to complete an accounting that had not been completed prior to the previous loss of operating power.

12 Claims, 7 Drawing Figures

POSTAGE METER USING A FLAG TO INDICATE INTERUPTION OF ACCOUNTING REGISTER UPDATING DUE TO POWER FAILURE OR MICROPROCESSOR FAILURE

This invention relates to electronic postage meters, and is more particularly directed to a method and arrangement for ensuring accuracy of the accounting of postage printed in such a postage meter.

Electronic postage meters having electronic accounting means and electronic storage registers are disclosed, for example, in U.S. Pat. No. 3,978,457 and U.S. Pat. No. 4,301,507. In such electronic postage meters, means must be provided to ensure that any postage printed is invariably accounted in the postage meter registers. In normal operations of the postage meter, during the continuous application of operating power, present day electronic postage meters reasonably assure accurate maintenance of accounting data.

In prior mechanical postage meters, positive mechanical interconnections were provided between the postage printing device and the mechanical accounting devices, so that conditions would not exist in which printing was not invariably accompanied by the updating of the mechanical accounting registers. Electronic registers cannot be positively intercoupled with the printing device in such a manner, however, and the operation in common of the postage printing device and a postage accounting device may be lost, if, for example, operating power for the electronic accounting system is lost at some instant during a printing cycle. In the past, various techniques have been suggested to overcome this problem. For example, a back-up power or energy source, such as a capacitor, may be employed to provide sufficient power to complete an accounting cycle, upon the loss of a main operating supply, as discussed in U.S. Pat. No. 3,978,457. In addition, as disclosed in U.S. Pat. No. 4,253,015, a mechanical counter may be coupled to the printing device, the position of the counter being compared with a count stored in the nonvolatile accounting memory to determine if a printing cycle has occurred without a corresponding accounting cycle.

The present invention is directed to the provision of a method and arrangement for invariably ensuring the proper accounting of postage, in an electronic postage meter, thus minimizing any requirement for back-up power to ensure completion of accounting cycles.

Briefly stated, in accordance with the invention, a portion of the working memory of the accounting system is configured to serve as a flag, while a further portion of the memory is configured to serve as a "postage field", storing data corresponding to the current setting of the postage meter. In addition, the working accounting memory includes at least one set of accounting registers, such as ascending, descending, and control-sum or check-sum registers. The program of the postage meter, such as a microcomputerized postage meter, effects the stepping or otherwise distinctive variation of the flag during any printing cycle, so that, upon loss of operating power, the setting of the flag provides a positive indication of the place of interruption of the accounting cycle. Accordingly, upon power-up, the program effects the testing of this flag, and the resumption of the accounting cycle, if necessary, at the proper location.

In one embodiment of the invention the accounting memory that is employed for accounting purposes in normal use, i.e., the working memory, is a nonvolatile memory, and includes "old" and "new" data field registers, the program sequentially updating the data in two sets of registers while maintaining distinctive states of the flag at each step of updating the registers. As a consequence, the exact point of stopping of any prior accounting cycle may be readily determined during a power-up cycle, so that the accounting cycle may be properly completed, if required.

In further embodiments of the invention, the working memory may be a volatile memory, with program steps provided for transferring a minimum of required data to a nonvolatile memory upon a loss of power. The reduction of the required transfer of data minimizes any requirements for temporary operating power to effect such a transfer.

In a still further embodiment of the invention, the working memory may have a single set of accounting registers, with the program effecting the modification of data in such registers sequentially in part, for example by way of a single additional transfer register, the flag again being distinctively set at each stage of updating of the registers. This arrangement minimizes the amount of working memory required in the accounting system.

The invention thereby enables the assurance of accurate accounting of postage printed in simple and economical manner, and is not disadvantageously affected by loss of power during a printing cycle.

In order that the invention be more clearly understood, it will now be disclosed in greater detail with reference to the accompanying drawings, wherein.

Figure 1:
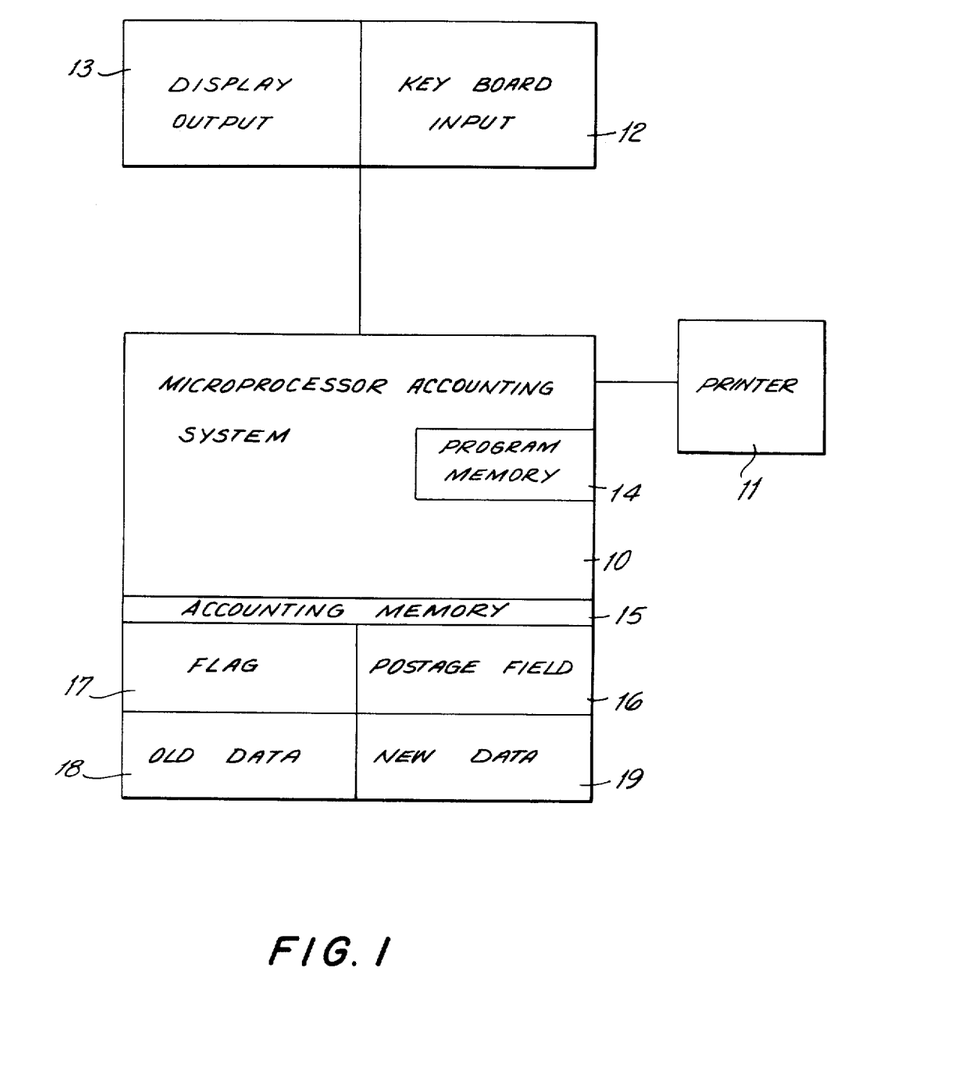
FIG. 1 is a block diagram of an electronic postage meter system in accordance with one embodiment of the invention.

Referring now to the drawings, and more in particular to FIG. 1, therein is illustrated a postage meter comprising, for example, a microprocessor system 10, a postage printer 11 connected to the accounting system, and a keyboard input 12 and display output 13 also coupled to the accounting system. The display 13 is of course optional, and the keyboard input 12 may be, alternatively, coupled to the data and control input for example, for a mailing machine.

The microprocessor accounting system may, for example, be of the type disclosed in U.S. Pat. No. 3,978,457 and U.S. Pat. No. 4,301,507, with modifications in the programming and organization of the accounting memory, as will be discussed in the following paragraphs.

The microprocessor accounting system includes the program memory 14, such as a read only memory, and a working accounting memory 15 including a plurality of accounting registers. In accordance with the invention, these registers include, but are not limited to, the postage field 16, flags 17, registers 18, for storing "old" data, and registers 19 for storing "new" data. In the embodiment of the invention of FIG. 1, the working memory 15 is a nonvolatile memory, so that data stored in the various registers of the memory is not lost by the removal of operating power from the postage meter system.

Figure 2:
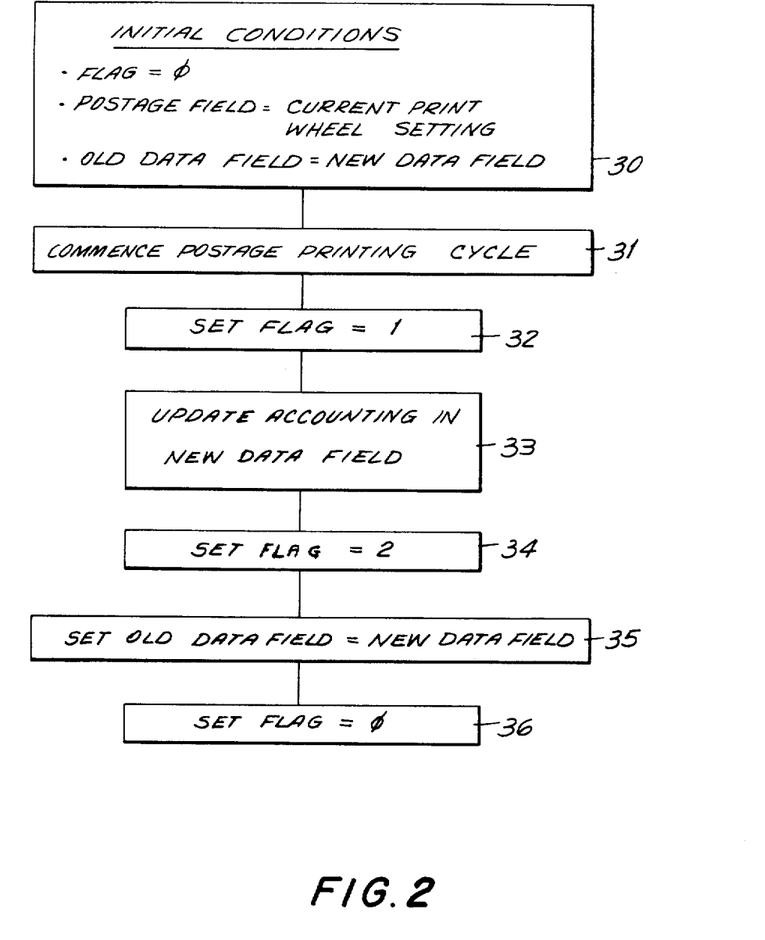
FIG. 2 is a flow diagram of the portion of the operation of the postage meter of FIG. 1 for accounting for postage printing.

The manner of operation of the postage meter in accordance with the invention will be better understood by reference to the flow diagram of FIG. 2, wherein block 30 represents the conditions of the registers in the postage meter when the meter has fully accounted for the prior printing of postage. In these conditions, the data stored in the old data field registers 18 is identical to the data stored in the new data field registers 19. These registers may include, for example, conventional ascending and descending registers, as well as registers, such as control sum registers, or check-sum registers, as disclosed, for example, in U.S. Pat. No. 3,978,457.

In addition, the flag portion 17 of the memory is set to zero and the postage field 16 is set to any current setting of the print wheels of the printer 11. The setting of the print wheels of the printer may be effected by conventional techniques, such as disclosed, for example, in U.S. Pat. No. 3,978,457. Upon the instruction 31 to the postage meter to commence a printing cycle, the flag is set to 1, as indicated in block 32. This commencement of the printing cycle may be initiated, for example, by a conventional trip lever responsive to the printing of postage at a printing position, or it may be responsive to direct input signals, for example, from a mailing machine or the like. The program of the postage meter is responsive to the input of such printing data to set the flag to 1. While the printing of postage is being effected in the printer 11, the program of the accounting system updates the memory, by modifying the data stored in the new data field registers in accordance with the print wheel settings, as represented by the data stored in the postage field 16. Following this step, at block 33 in FIG. 2, the flag 17 is set to "2", as indicated in block 34. The program now proceeds to set the data in the old data field registers 18 to be equal to the newly updated data in the new data field registers 19, as indicated at block 35. Finally, as illustrated in block 36, the flag is set to "0", the postage meter thus having fully accounted for the postage printed, and being prepared for a further printing cycle.

It will of course be understood that other settings of the flags may alternatively be employed.

In the event that operating power of the postage meter is lost, either intentionally or accidentally, it is of course necessary to determine whether or not the postage meter has fully accounted for any postage that has been printed. Thus, if the power to the accounting system is lost sometime during the printing cycle, the registers may not be fully updated, even though the printing cycle itself has been completed. The power-up program in accordance with the invention, for eliminating any errors resulting from loss of power, is illustrated on the flow diagram of FIG. 3. Upon the reestablishment of power, as illustrated in block 40, the program effects any necessary initialization. The program then effects the testing of the flag 17, in order to ascertain the progress of the postage meter through any previous printing cycles. If this test shows that the flags are set to zero, it is apparent that the data fields are up to date, and that no further accounting is necessary. Accordingly, the program enables further meter operations, as indicated at block 42.

Figure 3:
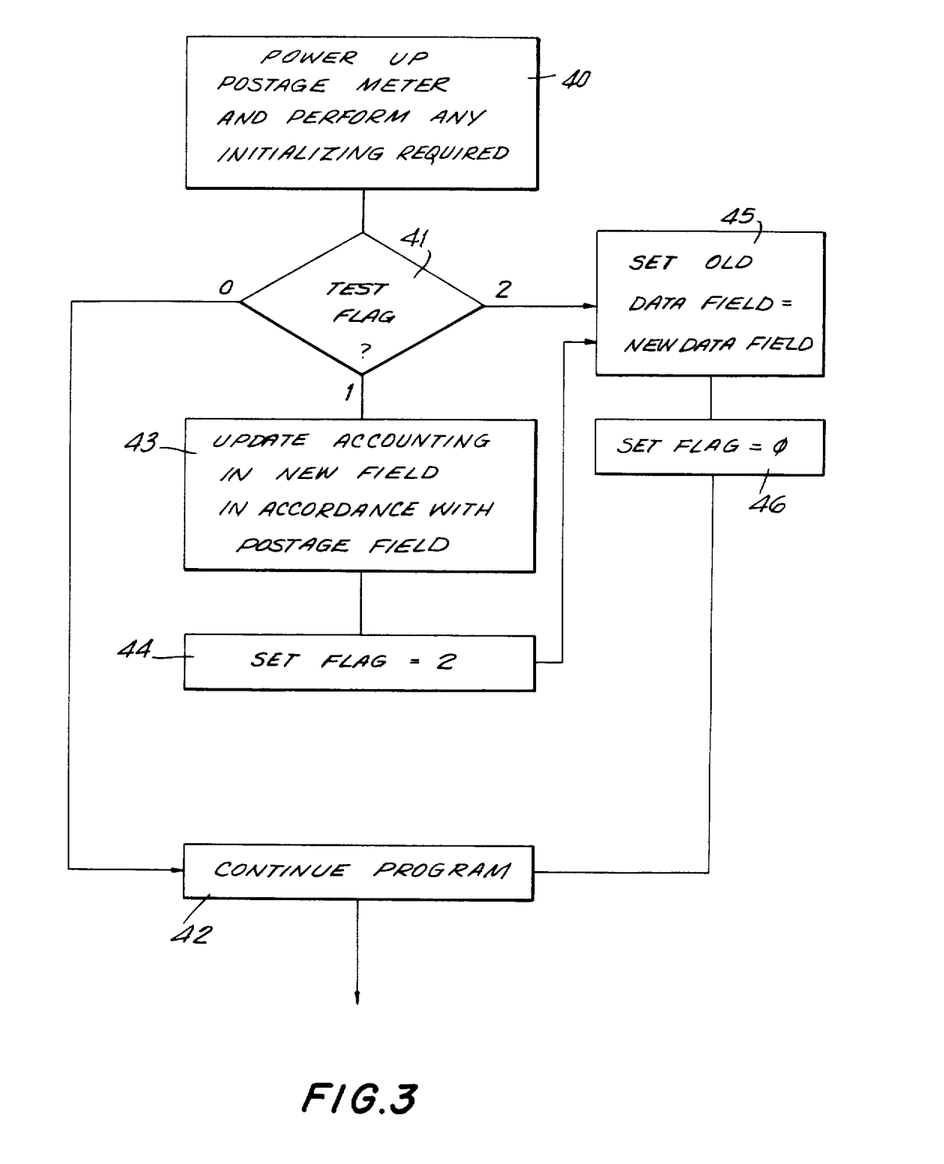
FIG. 3 is a flow diagram showing the updating of accounting in the postage meter power-up condition.

If, on the other hand, the testing of the flag shows that the flag is set to "1", it is apparent that power has been lost after the postage printing cycle had been commenced, and before updating of all registers has been completed. Accordingly, the program effects the updating of the data in the new data field registers in accordance with the contents of the postage field and the old data field, in block 43, and sets the flag to 2, at block 44. The program then effects the settings of the old data field registers to equal those of the data field registers to equal those of the data field registers, in block 45, followed by the setting of the flag to zero in block 46 and the enabling continuation of the postage meter operations in block 42.

If the test of the flags show that the flag setting was 2, it is apparent that the new data field registers have been correctly updated, but the old data field registers have not. Accordingly, in this event the old data field registers are updated in block 45, the flag is set to zero in block 46 and then the continuation of the postage meter program is enabled at block 42.

Figure 4:
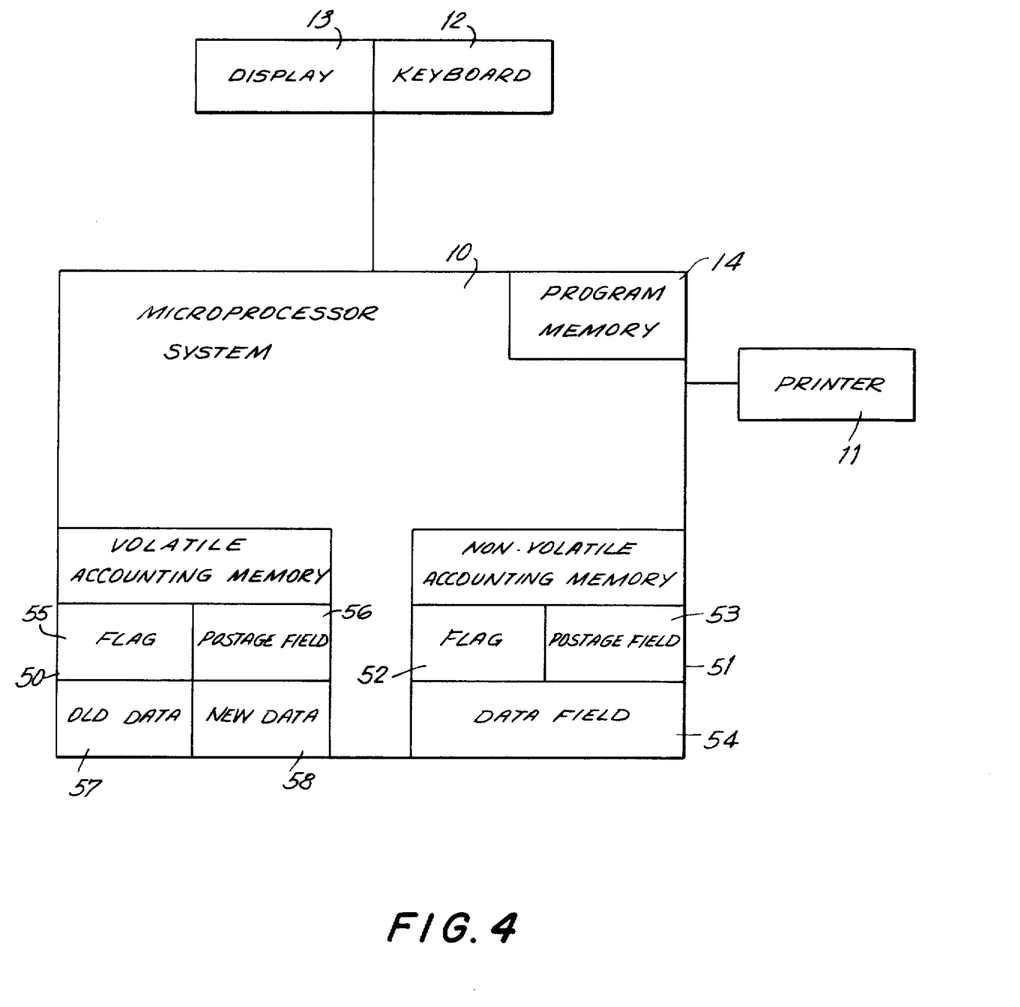
FIG. 4 is a block diagram of a modification of the postage meter system.

Instead of having nonvolatile working memory, in the arrangement of FIG. 1, the postage meter may alternatively have volatile working accounting memory 50, and nonvolatile back-up accounting memory 51, as illustrated in FIG. 4. In an arrangement of this type, for example, such as disclosed in U.S. Pat. No. 3,978,457, normal accounting functions are effected employing the volatile working memory 15, the accounting data being transferred to the nonvolatile accounting memory in the event of loss of operating power. In systems of this type, it is conventional to employ a back-up power supply, such as a capacitor, to enable the transfer of data following the loss of the main operating power. A "transfer" memory of the type illustrated in FIG. 4 may employ accounting logic of the type discussed with reference to FIGS. 1-3, with the additional steps of storing all data from the volatile memory to the nonvolatile memory upon power down, and restoring the data of the volatile memory in the initial stages of power-up.

In a further embodiment of the invention, in order to minimize the required transfer of data on power-up and power-down conditions, in accordance with the invention the nonvolatile portions of the accounting memory are provided with the flags 52 and postage field 53, but only a single group of data field registers 54. The volatile accounting memory 50, on the other hand, includes the flags 55, the postage field 56, the old data field registers 57 and the new data field registers 58.

Figure 5:
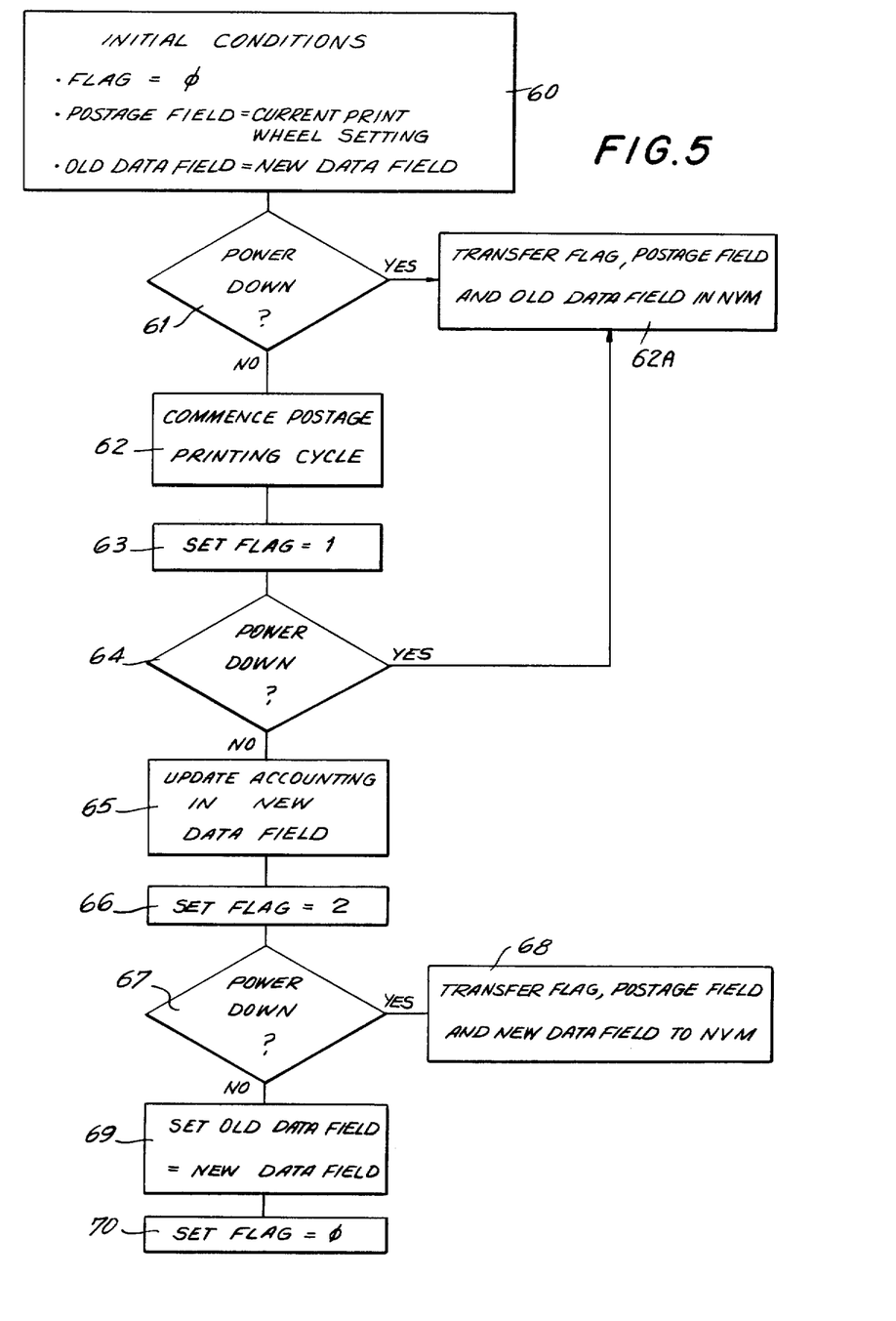
FIG. 5 is a flow diagram of the accounting system of the postage meter of FIG. 4.

FIG. 5 is a flow diagram of postage operation, under power-up conditions, for the postage meter of FIG. 4. As in the arrangement of FIGS. 1-3 the flag is initially set to zero, the old data field registers are set to the same values as the new data field registers, and the postage field contains any current print wheel settings. These register settings are the settings of the volatile working memory, at block 60. The postage meter is continually responsive to the occurrence of loss of power, for example to test blocks 61, 64 and 67, in order to enable the saving of the postage accounting data in the nonvolatile memory. These test may be effected, of course, on the basis of an interrupt initiated by the power-down condition, rather than directly as a step in the accounting sequence as illustrated in FIG. 5. Aside from the conditions detecting the loss of power, the program of FIG. 5 is generally the same as that of FIG. 2 with the flag being set to 1 in block 63 following the commencement of a printing cycle in block 62. Similarly, the flag is set to 2, in block 66 following the updating of the accounting in the new data field registers in block 65. The flag is set to zero in block 70 following the setting of the old data field registers to equal in new data field registers in block 59.

If power loss occurs at a time that the flag is set to zero, for example in the test at block 61 or in response to an interrupt, the flags, postage field, and data in the old data field registers are transferred to the nonvolatile memory, as illustrated at block 62A. Similarly, if the power is lost at a time that the flag is set to 1, for example in the step 64 or in response to an interrupt, the flags, postage field, and old data field registers are again transferred to the nonvolatile memory, as at block 62A. If, however, the flag is set to 2 at the time of power loss as detected at the block 67 or in response to an interrupt, the flags, postage field and new data field registers are transferred to the nonvolatile memory as illustrated at block 68.

Since the nonvolatile memory has only one set of data field registers, the transfer of only one of a new or old data field registers from the volatile memory can be effected in a shorter time, and hence require less temporary operating power storage for the transfer.

Figure 6:
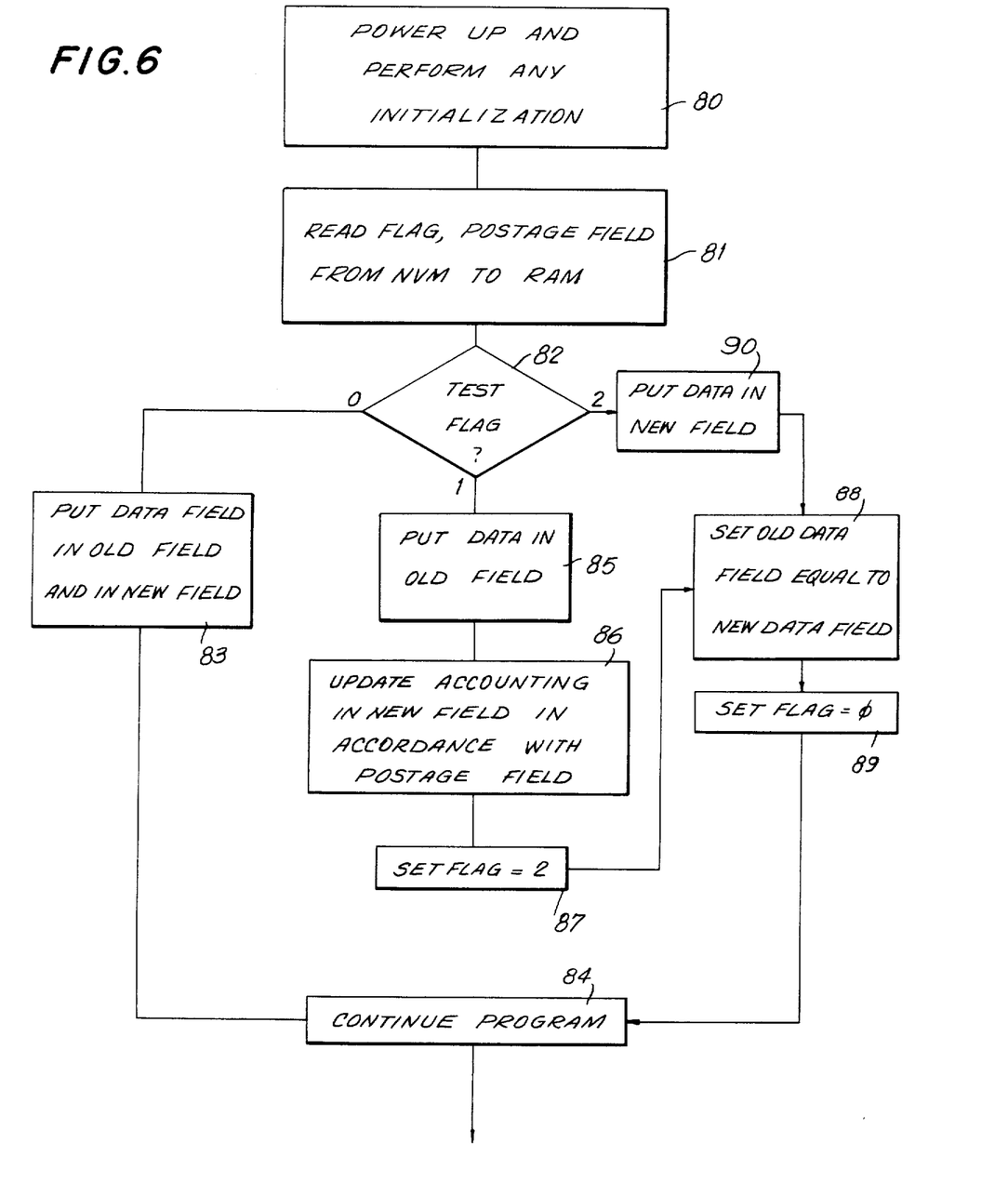
FIG. 6 is a flow diagram of the accounting on power-up, for the postage meter of FIG. 4.

Upon power-up as illustrated in FIG. 6, the program performs any required initialization at block 80 and transfers the flags and postage field from the nonvolatile memory to the volatile memory at block 81. The thus transferred flag is tested, in block 82 to determine where the data field is to be stored, and whether or not updating is required. If the test shows that the flag is equal to zero, it is evident that no accounting is required. Accordingly, the contents of the data registers from the nonvolatile memory are stored in the old data field registers and the new data field registers of the volatile memory, as illustrated at block 83. The postage meter program may then continue, as indicated at block 84.

If the test of the flag shows a value of 1, it is apparent that accounting had not been effected for the last printing cycle, accordingly, the accounting data is directed to the old data field registers at block 85, and accounting effects the updating of data in accordance with the postage field setting, at block 86, and the flag is set to 2 at block 87. Then the old data field registers are set equal to the new data field registers at block 88, the flag is set to zero at block 89, and the postage meter program may then continue, as indicated at block 84.

If the test of the flags at block 82 show a setting of 2, it is apparent that the accounting had been effected, and the data stored in the nonvolatile memory has taken into account the last printing operation. Accordingly, the data is placed in the new data field registers at block 90, and the old data field registers at block 88, followed by the setting of the flag to zero at block 89 and the enabling of the postage meter program to continue at block 84.

Figure 7:
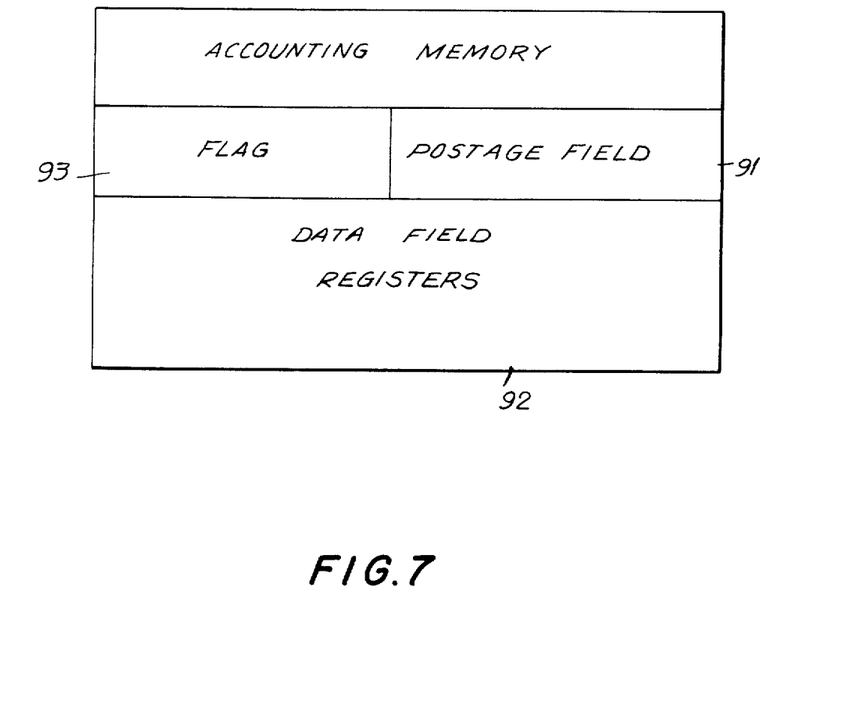
FIG. 7 is a block diagram of a modified memory system for the postage meter.

In some postage meter accounting systems, the working memory available for the accounting data may be limited, for example, when it is necessary to incorporate all of the accounting data memory within the microprocessor chip itself. In such event it may not be feasible to provide adequate memory space for complete sets of old data field registers and new data field registers, such as employed in the arrangement of FIGS. 1 and 4. In this event, the accounting memory may be organized as illustrated in FIG. 7, with flags 90, a postage field 91, and a single group of data field registers 92 incorporating, for example, an ascending register, a descending register and a control sum or check-sum register, as well as a single additional transfer register. In this arrangement, data may be updated sequentially in the different registers, by way of immediate transfers to the transfer register, with the flags having additional set positions and being stepped at each stage of the modification of the contents of the registers. For example, the descending registers may be initially updated by transferring the data therein to the transfer register, stepping the flag, updating the data in the descending register, and again stepping the flag. The ascending registers are then updated in a similar manner with the further stepping of the flags, and the control sum register next being updated with a still further stepping of the flags. The updating of the registers may of course be similarly effected in smaller incremental steps, with each step being represented by a distinctive flag. A separate flag may be employed to indicate the register that is being currently updated. As a consequence, upon the loss of power during a printing cycle, the flags enable determination of the progress of the accounting, so that the accounting procedure may be completed properly upon the return of the operating power to the system.

While the invention has been disclosed and described with reference to a limited number of embodiments, it will be apparent that variations and modifications may be made therein, and is therefore intended in the following claims to cover each such variation and modification as falls within the true spirit and scope of the invention.

What is claimed is:

1. In an electronic postage meter including an electronic accounting system having a memory arrangement, and a data input and printer coupled to the accounting system, the memory arrangement including an accounting memory arrangement for maintaining an accounting of printed postage and a program memory arrangement storing a program for controlling the printing of postage and accounting of postage printed; the improvement comprising means for storing data of the setting of said printer in a first portion of said accounting memory arrangement prior to the printing of postage under the control of said program, said accounting memory arrangement having a second memory portion for storing at least one flag, said accounting memory arrangement having third and fourth portions for storing accounting data, said program comprising means for sequentially updating accounting data in said third and fourth memory portions in response to the data stored in said first memory portion during said printing of postage while distinctively setting a flag in said second memory portion at a plurality of different times during said updating of accounting in said third and fourth memory portions, and power-up means responsive to the states of said flag for completing any accounting that had not been completed in a printing cycle prior to a loss of operating power.

2. The electronic postage meter of claim 1 wherein said program comprises means setting said flag to a first state at the commencement of a printing cycle whereby the data in said third memory portion is updated, means setting said flag to a second state upon said updating of said third memory portion, means setting the data in said fourth memory portion equal to that of said third memory portion when said flag is set to said second condition, and means setting said flag to a third state when the data in said fourth memory portion is equal to that of said third memory portion.

3. In an electronic postage meter including an electronic accounting system having a memory, and a date input and printer coupled to the accounting system, the memory including an accounting memory for maintaining an accounting of printed postage and a program memory for controlling the printing of postage and accounting of postage printed, the improvement wherein said accounting memory comprises a postage field for storing the current setting of the printer, a flag field, and at least two data fields of at least one accounting register, said program memory having a program comprising means for sequentially updating data in said data fields in response to data stored in said postage field and means for distinctively setting the flags field of the accounting memory at different stages of said sequential updating of said data fields, and comprising means responsive to the setting of said flags in the power-up sequence, for continuing any updating sequence that had been commenced during a prior loss of operating power.

4. The electronic postage meter of claim 3 wherein said data fields includes first and second sets of accounting data registers, said program sequentially updating the data in said registers in a printing cycle and changing the flags to correspond to the steps of updating of the registers.

5. The electronic postage meter of claim 3 wherein the accounting memory is a nonvolatile memory.

6. The electronic postage meter of claim 3 wherein said accounting memory is a volatile memory, and further comprising a nonvolatile memory for storing said flags and postage field and the data of at least one set of accounting registers, said program comprising means for transferring data from said volatile memory to said nonvolatile memory upon a loss of power and for transferring data from said nonvolatile memory to said volatile memory in a power-up operation.

7. The electronic postage meter of claim 6 wherein said nonvolatile memory includes a single set of accounting registers, said program transferring said flags and postage field to said volatile memory in a power-up cycle, and being responsive to the setting of the flags for transferring the data of the accounting registers of said nonvolatile memory to determined accounting registers of said volatile memory.

8. The electronic postage meter of claim 3 wherein said accounting registers include at least ascending and descending registers and a further register responsive to the combination of settings of the ascending and descending registers.

9. A method for maintaining accounting of postage printed in an electronic meter having a postage input, a memory and a postage print; comprising continually storing data of the setting of said printer in a first portion of said memory, updating at least one accounting register in a plurality of steps by updating said register in a second portion of the memory while printing postage on said printer, on the basis of data stored in said first portion of memory, and subsequently updating said register in a third portion of said memory, while distinctively modifying a flag in said memory at each of the steps, whereby the flags distinctively indicate the stage of updating of accounting.

10. The method of claim 9 further comprising the step of testing said flags in response to the application of operating power to the postage meter, and continuing the updating of accounting in the registers in response to the setting of the flags, whereby any accounting that was not effected prior to a loss of operating power is invariably completed upon a reapplication of the operating power.

11. The method of claim 9 wherein said step of modifying a flag in said memory comprises modifying said flag to a first state prior to updating said register in said second portion of said memory, modifying said flag to a second state between the updating of said second and third portions of said memory, and modifying said flag to a third state upon the updating of said third portion of said memory.

12. The method of claim 11 wherein said step of updating said third portion of said memory comprises making the data in said third portion of said memory equal to that of said second portion.

* * * * *

UNITED STATES PATENT AND TRADEMARK OFFICE
CERTIFICATE OF CORRECTION

PATENT NO. : 4,611,282

DATED : September 9, 1986

INVENTOR(S) : Robert B McFiggans

It is certified that error appears in the above-identified patent and that said Letters Patent is hereby corrected as shown below:

Column 8, line 12, change "print" to -- printer --.

Signed and Sealed this

Twenty-first Day of June, 1988

Attest:

DONALD J. QUIGG

Attesting Officer

Commissioner of Patents and Trademarks